Patented Sept. 22, 1936

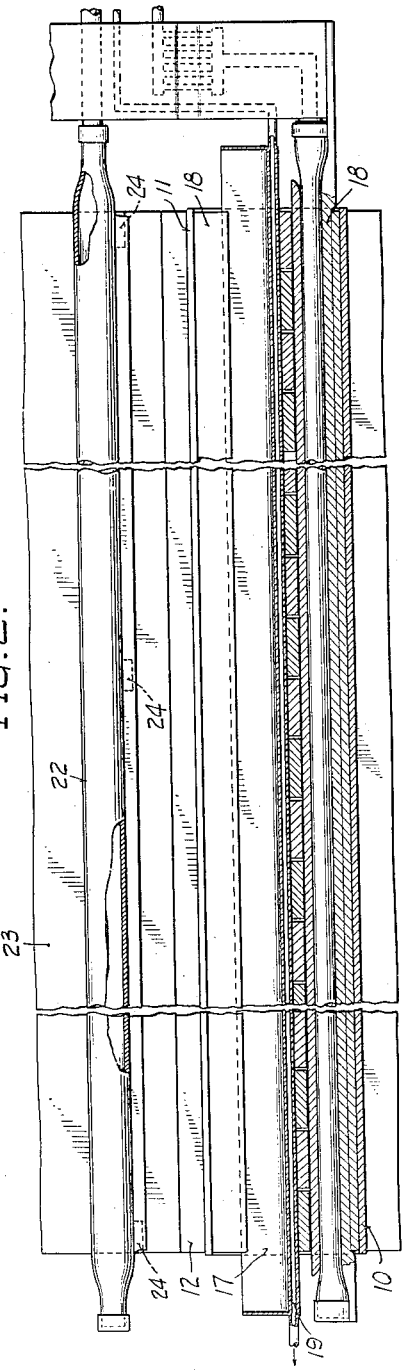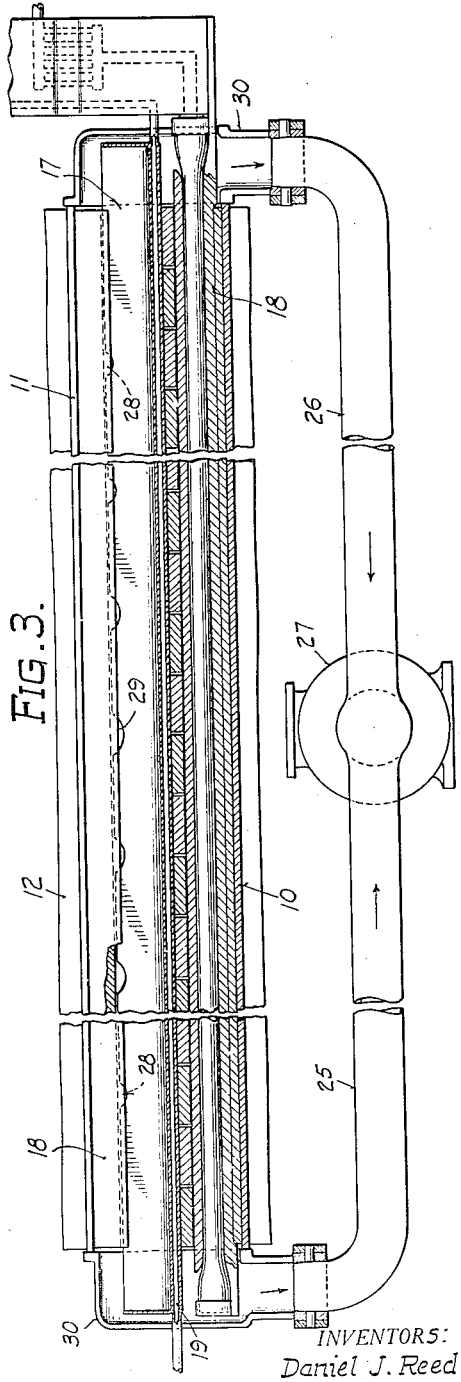

2,055,310

UNITED STATES PATENT OFFICE 2,055,310

ELECTRIC FLASH WELDING OF SEAMS IN METAL ARTICLES

Daniel J. Reed, Whitefish Bay, and Ivan Burggraf, Milwaukee, Wis., assignors to A. O. Smith Corporation, Milwaukee, Wis., a corporation of New York Application January 17, 1936, Serial No. 59,482

6 Claims. (Cl. 219—10)

It is an object of the present invention to improve the electric flash welding of seams in metal articles.

It is a further object of the invention to facilitate the flash welding of extended seams in relatively thick materials without the formation of objectionable weld flaws.

More specifically the present invention facilitates the welding of seams in tubes of considerable length by flash welding and also minimizes the possibility of the formation of imperfectly welded spots in such seams.

The flash welding of the longitudinal seams in tubular bodies has been attended with considerable difficulty and this has been particularly true where the metal being flashed is substantially thick and the diameter of the tube being welded is small. This difficulty has been attended with the formation of imperfectly welded spots or areas in the seam. These spots frequently have extended through the seams from surface to surface of the welds. Upon testing welds to destruction the above described spots sometimes have been dark in appearance and sometimes light in appearance. Some of these imperfections appear to be due to oxidation, but it is not clear that all such weakened areas are due to such a cause since many of these areas when broken have a bright appearing surface.

It has been found in connection with the present invention that the presence of the faulty or undesirable areas in the weld can be eliminated by a proper procedure in the welding. It has been discovered that modes of procedure in the welding operation which tend to prevent the passage of gases through the area of the open seam being flashed tend to eliminate this cause of poor welds.

During the flashing away of the metal of the edges to heat the same, gases are evidently produced by the vaporization of impurities in the steel and by chemical action. These gases accumulate in the tube or pipe being flashed and may, due to their high rate of formation, flow back through the flashing seam cleft at the time of closing the weld by the application of pressure. This action is increased by reason of the expanding of the gases in the pipe upon heating and the additional restriction put upon the gases by reason of the closing of the edges during flashing and consequent lessening of the volume of the pipe.

One method of welding procedure which tends to prevent gases from traversing the arcing gap, and which has been found to produce excellent flash welds in machines wherein electrodes are applied to the welding seam of the tube throughout its length on opposite sides of the seam is to apply across the seam between the electrodes and external to said tube a restriction to impede the flow of gases externally from said seam; then to apply the voltage and the flashing arc, utilizing a high rate of feed of the edges at the finish of the heating; and a quick application of pressure to complete the weld. As the gases accumulating in the tube flow endwise of the tube to get out, so also can the gases external to the tube be made to travel longitudinally in the same manner by the correct positioning of the restricting element placed externally along the seam for this purpose. A few simple adjustments of the position of this element results in an expulsion of the accumulated gases longitudinally of the seam with substantially no passage of gases through the open arcing gap at the time of the closing of the weld seam by pressure. This procedure has resulted in the production of welds substantially free from the defects above described.

Other means of balancing the flow of gases from the seam being flashed will be described later.

The invention will be better understood by referring to the accompanying drawings of which:

Fig. 2 is a longitudinal section taken on line 2—2 of Figure 1, parts being broken away; and Fig. 3 is a view similar to that of Fig. 2, but adapted for the practicing of the invention in a modified manner.

Figure 1:
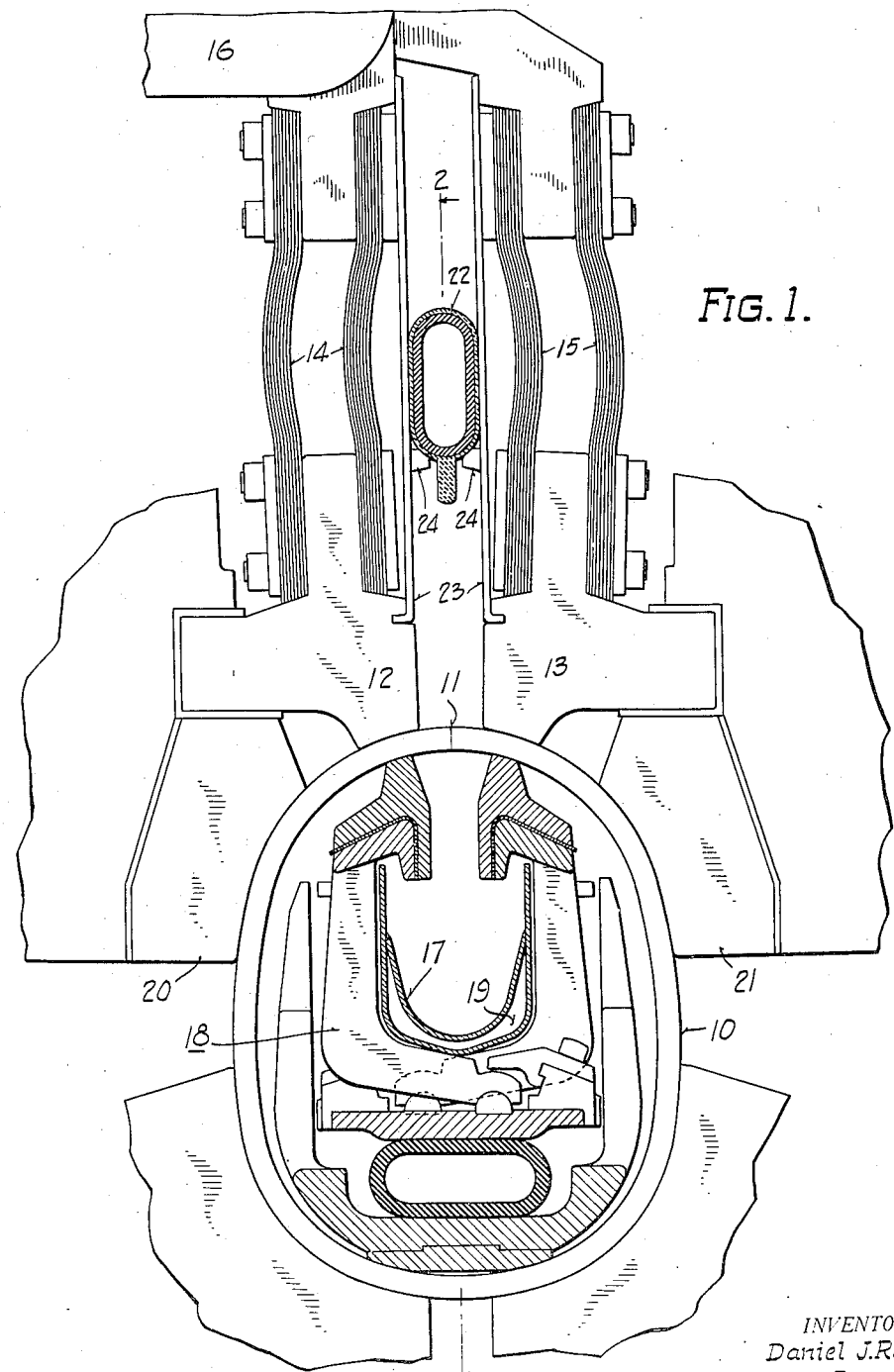
Figure 1 is an end elevation partly in section of an apparatus adapted for use in practicing the present invention.

Referring to Figures 1 and 2, 10 represents a tube, the seam 11 of which is to be flashed and welded. Tube 10 is shown as placed in a welding machine similar to that disclosed in Patent No. 1,872,793 to E. Nilson et al. Electrodes 12 and 13 are arranged to contact the tube 10 on opposite sides of the seam 11 which is to be flashed and welded. These electrodes 12 and 13 are connected by leads 14 and 15 to transformers 16 which constitute the source of voltage to supply the flashing arc with the necessary electric current. A trough 17 is provided inside the tube 10 to collect the metal flashed from said tube during the flash heating of seam 11. Trough 17 is shown as mounted in arbor 18 and is arranged to be water cooled by means of chamber 19 through which the water is passed. Welding dies 20 and 21 are provided to exert the welding pressure after the heating of the seam is accomplished.

The gases formed at the region of the flashing arc and expelled into trough 17 and tube 10 are compelled to flow longitudinally of said trough and tube or outwardly through the seam 11 and thus out above the tube. A restriction consisting of a hose 22 is placed above the seam 11 in the construction shown in Figures 1 and 2 and adjusted in position relative to said seam so as to cause the gases expelled outwardly from said seam 11 to flow mainly longitudinally of the seam and produce a condition of balance against that of the gases in tube 10, thereby preventing their passage through seam cleft 11.

It will be noted that in Figure 1, since the flow of gases in tube 10 is substantially longitudinal, the pressure of these gases near the middle of the tube are a maximum and near the ends a minimum. Thus it is that by utilizing a substantially tight restriction 22 on the outside of the tube seam a similar high gas pressure near the center (longitudinally) of the tube is produced and a minimum near the ends since the gases between this restriction and the seam being heated must also flow longitudinally of the tube.

By making a simple adjustment of restriction 22 toward or away from the tube the pressures of the outwardly escaping gases may be raised or lowered and thus create a balance between the gases on the two sides of the seam being heated from the center to the ends. In this manner flow of gases through the gap is prevented and flaw-free welds are obtained. Hose 22 is shown as placed between flash guards 23 and as held up in position by supports 24. The hose is kept tight during motion of the welding dies and electrodes by the application therein of a low pressure of air. The hose is protected by a wrapping of asbestos cloth against the sparks of the flashing arc and preferably is provided below with additional non-conducting insulation against the heat of the flashing arc.

An additional manner of balancing the outside and inside gas pressure against the seam being flash welded is illustrated in Fig. 3. Pipes 25 and 26 are conduits connecting the ends of tube 10 to a fan 27 which is employed to remove the gases as produced by the welding arc and thereby keep down the gas pressure in the tube being welded. It is advisable when the procedure of Fig. 3 is employed to have graduated openings from the weld area to the interior of tube 10 ranging in size from small openings 28 near each end of the tube to large opening 29 near the middle thereof. These openings may be provided in any suitable manner, those in Fig. 3 being shown as notches in the upper edges of the side walls of trough 17. These graduated openings insure a condition of uniform gas pressure adjacent the seam and a uniform removal of gas from the vicinity of said seam throughout the length of the tube by the removal laterally through said openings of more gas near the center of the tube than near its ends. Also it is important that the total rate of gas removal be the same as the rate of gas generation at the time of flashing immediately prior to the application of pressure to weld the same in order that this seam cleft be free from the passage of gas therethrough at the time of closing the seam. The application of too great a suction and the consequent pulling of air through the flashing gap at the time of closing the seam and welding the same would be detrimental and would probably cause areas of metallic oxide to be included in said weld. In Fig. 3 conduits 25 and 26 are provided with enclosures 30 which are in place and arranged to connect conduits 25 and 26 with the ends of tube 10 at the time of heating the seam 11 by the application of the flashing current.

The formation of oxides in the final flashing arc region or the production of other detrimental chemical action in said region may not be the only cause of the weld defects which have occurred when gases pass through the seam cleft just prior to the welding of the same. Arc disturbance and other physical actions may contribute to these undesirable results. By the practice of the present invention, however, whereby a procedure of welding is employed which effectively counteracts and eliminates the condition of unbalanced gas pressure on opposite sides of the flashing arc gap at the time of closing said gap and welding the seam, the flashing arc is maintained undisturbed and a weld of the highest quality is obtained.

The unbalance of pressure and the consequent traverse of gas through the flashing arc gap which the present invention eliminates by its procedure in the performance of the flash welding operation arises in the welding of long tubes of relatively small diameter and considerable thickness of metal, and also under any other conditions of flash welding where an accumulation of gases and their pressure may occur on one side of the flashing arc gap more than on the other at the time of completing the flash and joining the members under pressure to weld the same.

We claim:

1. In the flash welding of an extended seam between edges in a sheet metallic article in which the volumes of gases produced along said seam are impeded in their flow away from said seam upon one side thereof, the steps of applying from point to point along said seam on the opposite side thereof an impedance to the flow of gas therefrom to oppose the pressure of gas against the open cleft of said seam on the first side thereof during the later portion of the flash heating period of said welding operation and prevent the flow of gas through such cleft, and pressing said seam edges together to close said cleft and weld the seam edges while said gas flow impedance is being maintained.

2. In the flash welding of an extended seam between longitudinal edges of a tubular article in which the volumes of gases produced along said seam are impeded in their flow away from said seam by the confinement of said tube or other means, the steps of applying a suction graduated in amount from point to point along said seam to remove said gases and to prevent the passage of gas through the open cleft of the seam just prior to the finish of the flash heating period of said welding operation, and applying pressure between said edges to close said open seam cleft and weld said edges while said suction is being maintained.

3. In the flash welding of an extended seam between edges in a sheet metallic article in which operation volumes of gases formed along said seam during the flash heating period are obstructed in their flow away from said seam, the steps of applying from point to point along said seam a force to modify the flow of gas from the vicinity of said seam and prevent the flow of gas through the open seam cleft during the final portion of the flash heating period of said welding operation, and pressing said edges together to close said cleft and weld said edges while said force is being maintained.

4. The method of electric flash welding extended seams in metallic bodies, comprising arranging the edges to be joined in juxtaposed relation, establishing a flashing arc therebetween throughout their length to heat the same, maintaining said flashing arc and feeding said edges toward each other to supply the material to be flashed, applying along the seam length gas pressure modifying means to produce a balance of the gas pressures on opposite sides of the open seam cleft during the finish of the period of flash heating, and pressing said edges together to close said cleft and weld said edges while said equalized gas pressures are being maintained.

5. In combination with the flash welding of an extended seam between edges in a metallic article in which the volumes of gases produced along said seam are impeded in their flow away from said seam upon one side thereof, the step of applying along the seam gas pressure modifying means to produce a balance of the gas pressures on opposite sides of the seam cleft during the welding operation.

6. In combination with the flash welding of an extended seam between opposed edges of metal bodies under conditions such that the gases produced along said seam during the welding operation tend to set up a greater pressure on one side of the seam than on the opposite side, the step of applying gas pressure modifying means along said seam to balance the pressure on opposite sides of the seam cleft and prevent flow of gases therethrough during welding.

DANIEL J. REED.
IVAN BURGGRAF.